(12) United States Patent
Rippin et al.

(10) Patent No.: US 6,741,604 B1
(45) Date of Patent: May 25, 2004

(54) ADSL TRANSMISSION IN THE PRESENCE OF LOW-FREQUENCY NETWORK SERVICES

(75) Inventors: Boaz Rippin, Bet YehoShua (IL); Liron Frenkel, Netanya (IL)

(73) Assignee: Tioga Technologies, Inc., San Jose, CA (US)

( * ) Notice: Subject to any disclaimer, the term of this patent is extended or adjusted under 35 U.S.C. 154(b) by 0 days.

(21) Appl. No.: 09/451,541

(22) Filed: Dec. 1, 1999

Related U.S. Application Data (60) Provisional application No. 60/165,222, filed on Nov. 12, 1999.

(51) Int. Cl.⁷ .............................................. H04B 1/50
(52) U.S. Cl. .................. 370/431; 370/464; 370/480; 370/482; 370/484; 370/487; 370/490
(58) Field of Search .......................... 370/201, 431, 370/437, 359, 464, 480, 484, 486, 490, 487, 488, 493, 494, 482, 495; 375/419, 240, 240.02, 241

(56) References Cited

U.S. PATENT DOCUMENTS

| | | | |
|---|---|---|---|
| 5,208,804 A | * 5/1993 | Wilson et al. ............. | 370/343 |
| 5,519,731 A | 5/1996 | Cioffi | |
| 5,781,728 A | * 7/1998 | Rybicki et al. ............ | 709/230 |
| 5,907,812 A | * 5/1999 | Van De Berg ............ | 455/461 |
| 5,995,567 A | * 11/1999 | Cioffi et al. ............... | 375/346 |
| 5,999,563 A | * 12/1999 | Polley et al. .............. | 375/222 |
| 6,014,412 A | * 1/2000 | Wiese et al. ............... | 375/346 |
| 6,073,179 A | * 6/2000 | Liu et al. ................... | 709/229 |
| 6,167,095 A | * 12/2000 | Furukawa et al. ......... | 375/285 |
| 6,275,098 B1 | * 8/2001 | Uehara et al. ............. | 327/539 |
| 6,324,212 B1 | * 11/2001 | Jenness ..................... | 375/222 |
| 6,337,877 B1 | * 1/2002 | Cole et al. ................. | 375/222 |
| 6,373,860 B1 | * 4/2002 | O'Toole et al. ............ | 370/493 |
| 6,452,987 B1 | * 9/2002 | Larsson et al. ............ | 375/345 |

OTHER PUBLICATIONS

"G.lite.bis: Additional loop reach and rate from extended PSD mask over voice–band", *ITU—Telecommunications Standardization Sector*, Temp. Doc. NG–032, Nuremberg, Germany, Aug. 2–6, 1999, pp. 1–4.

"G.dmt.bis, G.lite.bis: Proposed Low–Band, Echo–Cancelled PSD Region for ADSL", *ITU Telecommunications Standardization Sector*, Temp. Doc. NT–116, Nashville, Tennessee, Nov. 1–5, 1999, pp. 1–2.

"G.gen–bis: Extending ADSL to the All Digital Loop service", *ITU Telecommunications, Standardization Sector*, Temp. Doc. MA–069, Melbourne, Australia, Mar. 29–Apr. 2, 1999, pp. 1–4.

(List continued on next page.)

*Primary Examiner*—Huy D. Vu
*Assistant Examiner*—Daniel Ryman
(74) *Attorney, Agent, or Firm*—Abelman, Frayne & Schwab (57) ABSTRACT

A method for providing Digital Subscriber Line (DSL) service to a group of subscribers over respective subscriber loops in the presence of another, existing digital network service provided on at least some of the subscriber loops. Lower, middle and upper frequency bands are assigned for transmission over the subscriber loops, such that the existing digital network service is provided on the lower band. DSL signals are transmitted downstream on the upper band and are received upstream on the middle band, generally without transmitting or receiving DSL signals on the lower band, over those subscriber loops on which the existing digital network service, is provided. Over those subscriber loops on which the existing digital network service is not provided, the DSL signals are transmitted downstream on the lower and upper bands and are received upstream on the lower and middle bands.

13 Claims, 3 Drawing Sheets

OTHER PUBLICATIONS

"Draft New Recommendation G.992.1: Asymmetrical Digital Subscriber Line (ADSL) Transceivers ", *ITU Telecommunications Standardization Sector*, G.992.1 Editor Final Version, Jul. 1999, pp. 1–5 and 138–166.

McCaslin, Shawn et al., "Performance and Spectral Compatibility of MONET–PAM HDSL2 with Ideal Transmit Spectra–Preliminary Results", *Single–Pair HDSL (HDSL.2) Standards Project*, Sep. 22–26, 1997, Minneapolis, MN. pp. 1–5.

"G.gen: Optimal Asymmetric Transmit PSD for All–Digital Services", *ITU—Telecommunications Standardization Sector*, Temp Doc. NG–079r1, Nuremberg, Germany, Aug. 2–6, 1999, pp. 1–5.

* cited by examiner

ADSL TRANSMISSION IN THE PRESENCE OF LOW-FREQUENCY NETWORK SERVICES

CROSS-REFERENCE TO RELATED APPLICATIONS

This application claims the benefit of Provisional Application No. 60/165,222, filed Nov. 12, 1999.

This application claims the benefit of a U.S. Provisional Patent Application entitled "Method and Apparatus for ADSL Transmission in the Presence of Low-Frequency Services," filed Nov. 12, 1999, which is assigned to the assignee of the present patent application and is incorporated herein by reference.

FIELD OF THE INVENTION

The present invention relates generally to high-speed data communication systems, and specifically to Asymmetric Digital Subscriber Line (ADSL) systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. A range of DSL standards have been defined, known generically as "xDSL," wherein the various standards have different data rates and other associated features but share common principles of operation.

The present patent application is concerned mainly with Asymmetric DSL (ADSL) service, which allows data to be conveyed downstream to the subscriber at a rate of about 8 Mbit/s, and to be returned upstream from the subscriber at about 640 kbit/s. ADSL is based on a discrete multi-tone (DMT) transmission system, in which data are encoded using 256 different "tones," each corresponding to a frequency band 4.3125 kHz wide. Recommendation G.992.1 (ex-G.dmt) of the International Telecommunication Union (ITU), which is incorporated herein by reference, specifies the physical layer characteristics of the ADSL interface to the subscriber line, including the allocation of the tones in the frequency spectrum to upstream and downstream service.

Annex A of G.992.1 specifies requirements for ADSL operating on a telephone line in the frequency band above that used for "plain old telephone service" (POTS). Upstream ADSL service is allocated tones 6 through 31 (25.875 to 138 kHz). Downstream service may use all of tones 6 through 255 (25.875 up to 1104 kHz), as long as echo cancellation is applied in the upstream service range. Alternatively, downstream service may be limited to tones 32 through 255 if necessary to reduce near-end crosstalk (commonly referred to as "NEXT") with the tones of the upstream signals. The range below about 25 kHz is left for POTS audio signals.

Figure 1:
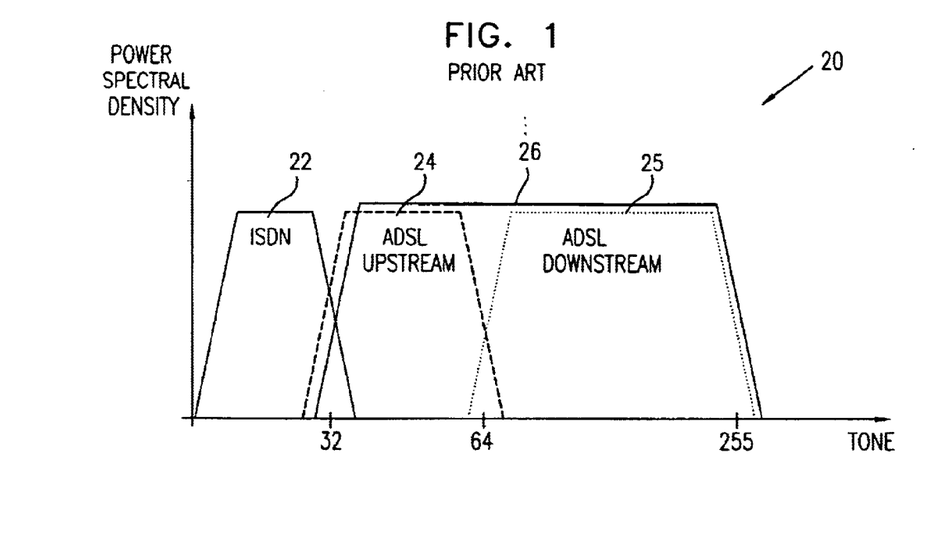
FIG. 1 is a schematic diagram showing spectral masks for ADSL and ISDN transmissions on a common subscriber loop, in accordance with standards known in the art.

FIG. 1 is a schematic diagram showing allocation of frequencies when ADSL and ISDN (Integrated Service Digital Network) services are provided over a common subscriber loop, as specified in Annex B of G.992.1. The diagram schematically illustrates a set of spectral masks 20 given in the standard. The shapes of the masks are simplified here for clarity of illustration, the horizontal axis is not drawn to scale, and the vertical scale of power spectral density (PSD) is arbitrary, As shown in the figure, the range below 138 kHz (corresponding to tones 0–31) is unavailable to ADSL, as it must be left clear for ISDN transmission in a lower band 22. Tones 32 through 63 are allocated to ADSL upstream transmission in a middle band 24, while tones 32 through 255 are allocated to ADSL downstream transmission in an upstream band 26. In practical implementations, however, it is frequently necessary to limit the downstream transmission to an upper band 25, roughly covering the range of tones 64–255, in order to reduce NEXT.

ADSL service providers must be concerned not only with crosstalk between upstream and downstream transmissions on a single subscriber loop, but also with crosstalk between different loops in the same central office. This crosstalk can be particularly severe in the range of tones 32 through 63, which is allocated to downstream transmission in Annex A and to upstream transmission in Annex B. For this reason, service provider's may find it necessary to use the Annex B ADSL spectrum not only when ADSL is provided over an ISDN line, but also for ADSL over POTS. This solution wastes valuable bandwidth and can severely degrade the ADSL downstream performance.

A range of variations on the standard ADSL spectral profiles have been proposed, in order to increase the upstream and/or downstream data rates while reducing crosstalk interference. For example, U.S. Pat. No. 5,519,731, whose disclosure is incorporated herein by reference, describes a DMT transmission scheme for use in ADSL, which is intended to mitigate T1 crosstalk noise in the ADSL signals. The scheme uses 512 subchannels, rather than the conventional 256 tones. Some of the added subchannels may be made available for Upstream communications, so as to increase the upstream data rate.

ITU Temporary Document NG-079r1, which is incorporated herein by reference, proposes an optimal asymmetric power spectral density mask for all-digital services, particularly for ADSL. In this proposal, the band of tones 0–6, which is set aside for POTS in the above-mentioned Annex A, is shared between upstream and downstream ADSL transmissions. In other words, both upstream and downstream masks are allowed to extend down to tone 0 in order to increase their data rate. Because NEXT typically increases strongly with frequency, however, the tones in the upper range of the upstream band, between about 90 and 138 kHz (roughly tones 21–32), are masked out of the downstream band.

SUMMARY OF THE INVENTION

It is an object of some aspects of the present invention to provide methods and apparatus for reducing crosstalk in ADSL transmissions.

It is a further object of some aspects of the present invention to provide methods and apparatus that enable improved exploitation of the spectrum available for ADSL, particularly in the presence of other network services, such as ISDN.

In preferred embodiments of the present invention, an improved spectral utilization scheme is introduced for use in ADSL service on a group of subscriber loops, at least some of which are also used for an existing digital network service, such as ISDN. Lower, middle and upper frequency bands are defined for transmission over the subscriber loops. The existing digital network service is provided on the lower band, and the middle and upper bands are used respectively for upstream arid downstream ADSL transmission. This scheme accords with G.992.1 Annex B. For those subscriber loops that do not receive ISDN service, however, the lower band, at least down to the POTS range, is exploited to provide additional transmission bandwidth for both upstream and downstream ADSL transmissions.

Preferred embodiments of the present invention offer a number of advantages over ADSL spectral utilization schemes known in the art. The use of both the lower and middle bands for upstream transmission by non-ISDN subscribers increases the available upstream bandwidth. On the other hand, because there is no downstream transmission in the middle band, crosstalk in this band is substantially eliminated, including both NEXT on individual subscriber loops and inter-subscriber crosstalk between the non-ISDN and Annex B subscriber loops that are served by the same central office. Non-ISDN subscribers thus receive ADSL service with substantially greater bandwidth than can generally be offered in a mixed Annex B and non-ISDN environment that uses methods and apparatus known in the art.

In some preferred embodiments of the present invention, a modem is configurable so as to provide either Annex B service, combining ADSL and ISDN transmission, or ADSL service (with or without POTS) using the novel spectral utilization scheme described hereinabove. This type or modem may then be used for all of the subscribers served by the central office. The choice of Annex B or non-ISDN service is implemented simply by switching the lower frequency band in or out of ADSL use, using either hardware or software switching. Alternatively, different modems may be used for different subscribers, depending on their choice of services.

Although preferred embodiments are described herein with reference to ADSL and ISDN services and certain specific spectral bands used for these services, it will be appreciated that the principles of the present invention may similarly be applied to other types of digital transmissions, and particular to transmissions in accordance with other standards in the xDSL family.

There is therefore provided, in accordance with a preferred embodiment of the present invention, a method for providing Digital Subscriber Line (DSL) service to a group of subscribers over respective subscriber loops in the presence of another, existing digital network service provided on at least some of the subscriber loops, the method including:

assigning lower, middle and upper frequency bands for transmission over the subscriber loops, such that the existing digital network service is provided on the lower band;

transmitting DSL signals downstream on the upper band and receiving DSL signals upstream on the middle band, generally without transmitting or receiving DSL signals on the lower band, over those subscriber loops on which the existing digital network service is provided; and transmitting DSL signals downstream on the lower and upper bands and receiving DSL signals upstream on the lower and middle bands over those subscriber loops on which the existing digital network service is not provided.

Preferably, the existing digital network service includes an Integrated Service Digital Network (ISDN) service, and the DSL service includes Asymmetric DSL (ADSL) service. Most preferably, transmitting the DSL signals over those subscriber loops on which the existing digital network service is provided includes transmitting ADSL signals substantially in accordance with Annex B of standard G.992.1 of the International Telecommunications Union. Alternatively or additionally, the method includes transmitting plain old telephone service (POTS) signals over those subscriber loops on which the existing digital network service is not provided.

Preferably, the DSL service includes Asymmetric DSL (ADSL) service, and wherein the lower band includes approximately the range of ADSL tones 6 through 31, and the middle band includes approximately the range of ADSL tones 32 through 63.

In a preferred embodiment, transmitting the DSL signals over those subscriber loops on which the existing digital network service is not provided includes transmitting the signals via a filter that is configurable for transmitting the DSL signals on the lower band, and transmitting the DSL signals over those subscriber loops on which the existing digital net-work service is provided includes switching the configurable filter so as not to transmit the DSL signals over the lower band.

Preferably, receiving the DSL signals upstream on the lower and middle bands over those subscriber loops on which the existing digital network service is not provided includes canceling echoes due to the DSL signals transmitted downstream in the lower band. Most preferably, receiving the DSL signals upstream on the lower and middle bands includes substantially eliminating reception of upstream signals in a range of tones near an upper edge of the middle band, and wherein transmitting the DSL signals downstream includes substantially eliminating transmission of downstream signals in a range of tones near a lower edge of the upper band, whereby only echoes in the lower band need be canceled.

There is also provided, in accordance with a preferred embodiment of the present invention, a method for providing Asymmetric Digital Subscriber Line (ADSL) service to a subscriber over a subscriber loop, the method including:

transmitting ADSL signals downstream over the subscriber loop in a lower band consisting approximately of the range of ADSL tones 6 through 31 and in an upper band consisting approximately of the range of ADSL tones 64 and above, but substantially not in a middle band between the lower and upper bands; and receiving ADSL signals upstream from the subscriber loop in the lower band and in the middle band.

Preferably, receiving the ADSL signals Upstream includes receiving and processing signals only in the lower band when the subscriber is not equipped to transmit signals in the middle band.

There is additionally provided, in accordance with a preferred embodiment of the present invention, a method for providing Asymmetric Digital Subscriber Line (ADSL) service to a subscriber over a subscriber loop, the method including:

transmitting ADSL signals downstream over the subscriber loop in a lower band consisting approximately of the range of ADSL tones 6 through 31 and in an upper band consisting approximately of the range of ADSL tones 64 and above, but substantially not in a middle band between the lower and upper bands; and receiving ADSL signals upstream from the subscriber loop in the lower band.

There is further provided, in accordance with a preferred embodiment of the present invention, apparatus for providing Digital Subscriber Line (DSL) service to a subscriber over a subscriber loop, the modem including:

downstream processing circuitry, configured to generate DSL signals to be transmitted over the subscriber loop in a lower frequency band, having A low-frequency cut-off above a plain old telephone service (POTS) band, and in an upper frequency band, but substantially not in a middle frequency band between the upper and lower bands; and upstream processing circuitry, configured to receive DSL signals upstream from the subscriber loop in the lower band and in the middle band.

In a, preferred embodiment, the downstream and upstream processing circuitry is configurable so as to limit the DSL signals to the middle and upper bands, whereby the lower band is made available for another digital network service.

Preferably, the apparatus includes a line coupling circuit, which is adapted to couple both the downstream and upstream DSL processing circuitry and signals associated with the other digital Network service to the subscriber loop. In a preferred embodiment, the apparatus includes a high-pass filter, operative to implement the low-frequency cut-off of the lower band in the DSL signals, at approximately an upper edge of the plain old telephone service (POTS) band, and a low-pass filter, operative to implement a high-frequency cut-off in the signals associated with the other digital network service, at approximately a high-frequency limit of the other digital network service, substantially above the upper edge of the POTS band. Preferably, the upstream processing circuitry includes a configurable filter, which cuts off signals in the lower band when the lower band is used for the other digital network service.

There is furthermore provided, in accordance with a preferred embodiment of the present invention, Digital Subscriber Line (DSL) subscriber equipment, adapted to be coupled to a subscriber loop over which another existing digital network service may also be provided on a lower frequency band, the equipment including:

a first DSL modem, which is configured to receive DSL signals transmitted upstream on a middle frequency band above the lower frequency band and to transmit DSL signals downstream on an upper frequency band above the middle frequency band, such that the lower frequency band is substantially free of the DSL signals, over a first one of the subscriber loops, on which the existing digital network service is provided; and a second DSL modem, which is configured to receive DSL signals transmitted upstream on the lower and middle bands and to transmit DSL signals downstream on the lower and upper bands over a second one of the subscriber loops, on which the existing digital network service is not provided.

Preferably, the first and second DSL modems include circuitry that is configurable so as to enable selection of either the DSL signals or the existing digital network service for transmission on the lower band.

Further preferably, the system includes subscriber equipment, coupled to at least one of the first and second subscriber loops so as to communicate with the respective first or second DSL modem, wherein the subscriber equipment includes circuitry that is configurable so as to enable selection of either the DSL signals or the existing digital network service for reception on the lower band.

There is furthermore provided, in accordance with a preferred embodiment of the present invention, Digital Subscriber Line (DSL) subscriber equipment, adapted to be coupled to a subscriber loop over which another existing digital network service may also provided on a lower frequency band, the equipment including:

a DSL modem; and a splitter, which is coupled to convey signals having frequencies above the lower frequency band between the subscriber loop and the DSL modem, and which is switchable so as to couple signals on the lower frequency band either to equipment associated with the existing digital network service or to the DSL modem.

There is additionally provided, in a Digital Subscriber Line (DSL) service environment, wherein DSL service is provided to a group of subscribers over respective subscriber loops in the presence of another, existing digital network service provided on a lower frequency band on at least some of the subscriber loops, a method for accessing the DSL service on the subscriber loops on which the other, existing digital network service is not provided, the method including:

transmitting upstream DSL signals on the lower band and on a middle band above the lower band; and receiving downstream DSL signals on the lower band and on an upper band above the middle band, generally without receiving downstream signals on the middle band.

The present invention will be more fully understood from the following detailed description of the preferred embodiments thereof, taken together with the drawings in which:

DETAILED DESCRIPTION OF PREFERRED EMBODIMENTS

Figure 2:
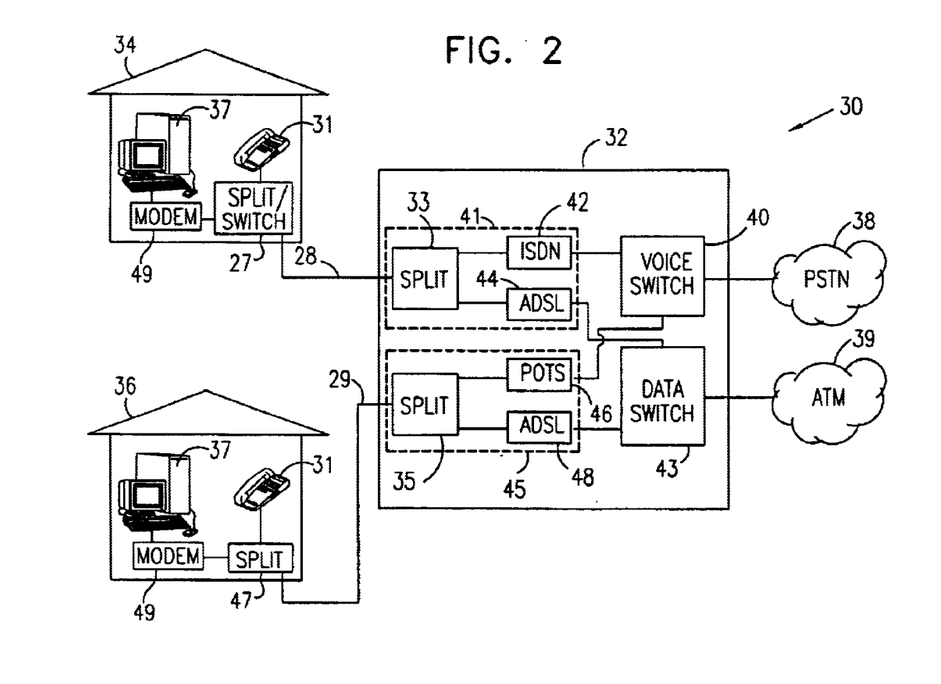
FIG. 2 is a block diagram that schematically illustrates a system for providing ADSL, ISDN and POTS services, in accordance with a preferred embodiment of the present invention.

Reference is now made to FIG. 2, which is a block diagram that schematically illustrates a system 30 fox providing a mixture of subscriber loop services to subscribers, in accordance with a preferred embodiment of the present invention. The subscribers include typical subscribers 34 and 36, who are served by a central office 32 over respective subscriber lines 28 and 29. These lines connect to respective subscriber line equipment 41 and 45 in office 32. Equipment 41 includes a splitter 33, communicating with an ISDN modem 42 and an ADSL modem 44, so as to provide subscriber 34 with both ISDN and ADSL digital services, in accordance with Annex B of the G.992.1 standard. Equipment 45 includes a splitter 35, communicating with a POTS link 46 and an ADSL modem 48, so as to provide subscriber 36 with voice telephony and ADSL digital services. Voice switching circuitry 40 in the central office links the ISDN and POTS subscriber equipment to a network 38, typically a public switched telephone network (PSTN). Data switching circuitry 43, such as an Asynchronous Transfer Mode (ATM) or frame relay concentrator, links the ADSL equipment to a data network 39.

Subscribers 34 and 36 typically have a telephone 31 and a computer 37 with a suitable modem 49, as well as other, optional equipment, connected to respective lines 28 and 29. Subscriber 36 uses a splitter 47, as is known in the art, to separate the POTS service from ADSL data on line 29 and route the signals to telephone 31 and computer 37 accordingly. Subscriber 34 uses a switchable splitter 27 to perform several functions: (1) dividing ISDN signals between telephone 31 and computer 37, (2) separating the ISDN service from the ADSL data; and (3) assuming that the computer has both ISDN and ADSL modems, selecting whether the computer is to receive ISDN or ADSL service. Optionally, splitter 27 is further switchable such that lower frequency band 22 (FIG. 1) may be switched between ISDN and ADSL service, as described hereinbelow. Such a splitter can then also perform the function of POTS splitter 47. The selection of ISDN or ADSL service nay be performed manually or under software control.

Figure 3:
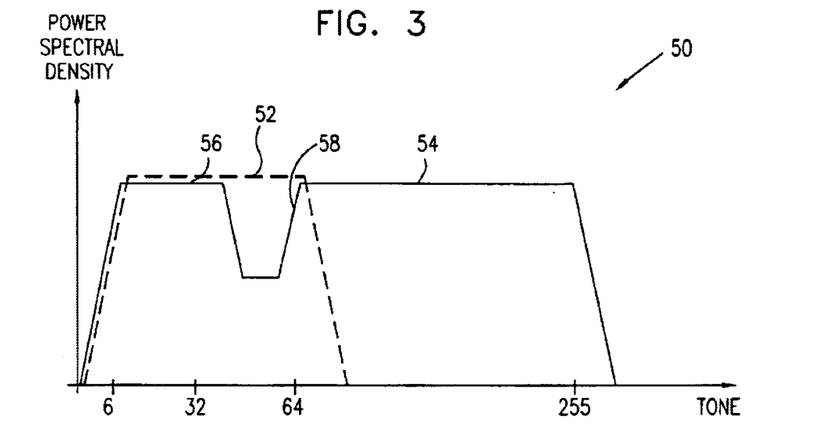
FIG. 3 is a schematic diagram showing spectral masks for ADSL transmissions, in accordance with a preferred embodiment of the present invention.

FIG. 3 is a schematic, simplified diagram showing spectral masks 50 applied to ADSL signals transmitted between central office 32 and subscriber 36, in accordance with a preferred embodiment of the present inventions. The signals transmitted between the central office and subscriber 34, who also receives ISDN service, are in accordance with Annex B, substantially as shown in FIG. 1. Masks 50, however, differ from the standard Annex A masks in the following manner;

An upstream mask 52 extends from tone 6 to about tone 63 (25.875 to 276 kHz). Mask 52 thus covers both lower band 22 and middle band 24 shown in FIG. 1. Optionally, mask 52 may be extended down to tone 0, as described in the above-mentioned NG-079r1 document. Alternatively, mask 52 may be limited to the range of tones up to tone 31, since many existing ADSL systems are not capable of supporting upstream transmission above tone 32.

A downstream mask 54 comprises a lower portion 56, extending from tone 6 to about tone 31 (25.875 to 138 kHz) and an upper portion 58 from tone 64 through tome 255 (276 kHz to 1104 kHz). In between portions 56 and 58, mask 54 is suppressed by at least 10 dB, and preferably by at least 40 dB, in order to avoid crosstalk with upstream ADSL transmissions in the range of middle band 24 on both lines 28 and 29. Optionally, lower portion 56 also extends down to tone 0.

It will be appreciated that the limits of the bands in the upstream and downstream masks that are shown in FIG. 3 and described hereinabove are assigned for the purposes of convenience and compatibility with ADSL standards. In other embodiments of the present invention, these limits may be increased or decreased in accordance with application requirements. In particular, the limits may be varied so as to change the relative portions of the bandwidth that are allocated to upstream and downstream transmissions. The terms "about" and "approximately," used in reference to the band limits in the present patent application and in the claims, should therefore be interpreted loosely.

Figure 4:
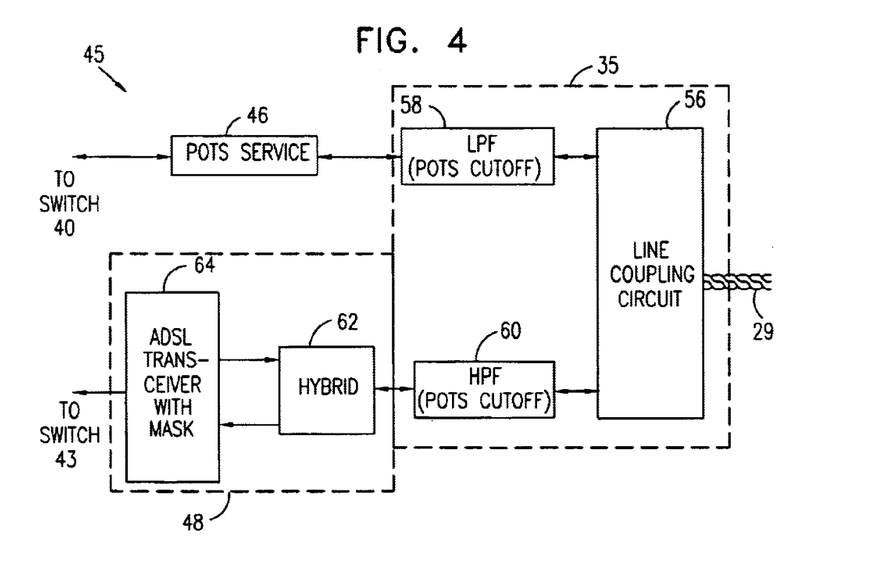
FIG. 4 is a block diagram that schematically illustrates subscriber line equipment for use in the system of FIG. 2, in accordance with a preferred embodiment of the present invention.

FIG. 4 is a block diagram that schematically illustrates details of subscriber line equipment 45, in accordance with a preferred embodiment of the present invention. The equipment is configured to provide both POTS and ADSL service to subscriber 36 over line 29. A line coupling circuit 56, comprising a suitable transformer and/or solid-state devices, as are known in the art, splits the signals on line 29 into low- and high-frequency components, typically above and below the POTS cutoff frequency of about 20 kHz. A low-pass filter 56 filters the POTS voice signals. A high-pass filter 6 filters the ADSL signals, which are processed by a hybrid circuit 62 and an ADSL transceiver 64 as described hereinbelow. Although filter 60 is shown in FIG. 4 as being a part of splitter 35, the high-pass filtering function may, alternatively or additionally, be performed by modem 48. Transceiver 64 applies masks 50 to the ADSL signals, as shown in FIG. 3.

Figure 5:
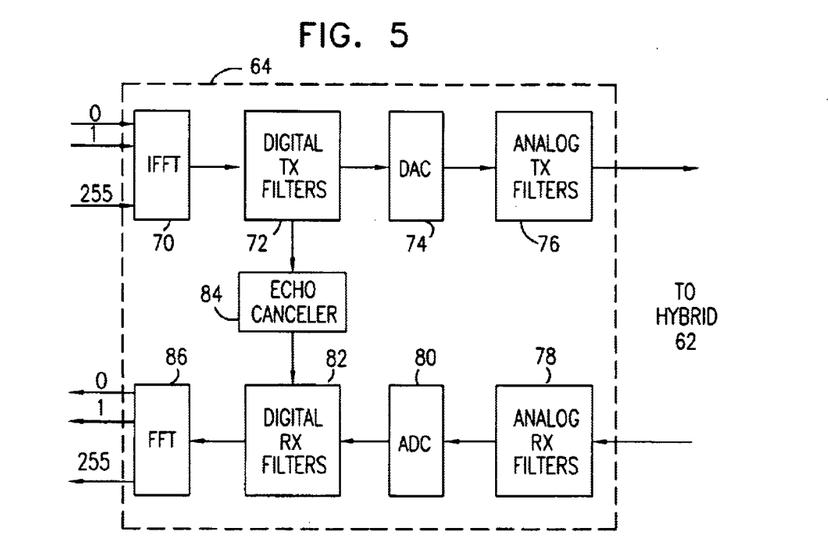
FIG. 5 is a block diagram that schematically illustrates details of the equipment of FIG. 4, in accordance with a preferred embodiment of the present invention.

FIG. 5 is a block diagram that schematically illustrates further details of ADSL transceiver 64, in accordance with a preferred embodiment of the present invention. Incoming downstream digital data from network 38 are received by an inverse fast Fourier transform (IFFT) processor 70, which generates discrete multitone (DMT) signals, as is known in the ADSL art. Processor 70 is set to zero tones 32–63, in the range of middle band 24, in accordance with downstream mask 54. Digital transmit filters 72 are preferably applied to the DMT signals so as to achieve additional suppression in the middle band. The downstream signals are then converted to analog form by a digital/analog converter 74 and filtered by analog transmit filters 76 before being passed on to line 29 via high-pass filter 60.

Upstream DMT signals from line 29 are filtered by analog receive filters 78 and converted to digital form by an analog/digital converter 80. An echo canceler 84 is used to cancel echoes produced by the downstream signal, primarily in lower portion 56 of the downstream mask, which overlaps with upstream mask 52. Typically, the echo canceler comprises an adaptive finite impulse response (FIR) digital filter, whose coefficients are adjusted to minimize the residual echo using a least mean square (LMS) algorithm, or any other suitable technique known in the art. The upstream signals are filtered by digital receive filters 62 and are then output to network 38 by a FFT processor 86 capable of handling tones 0 through 63.

Optionally, the upper frequency of upstream mask 52 is decreased, and the lower frequency of upper portion 58 of downstream mask 54 is increased, relative to the frequencies shown in FIG. 3. (In other words, tones in a narrow range around tone 64 are not used.) The high-frequency overlap of the upstream and downstream signals is thus reduced. Echo canceler 84 can then operate at a relatively low rate, like echo canceling filters in conventional Annex A-type modems known in the art, since it need be concerned only with echoes due to lower portion 56 of the downstream mask.

Figure 6:
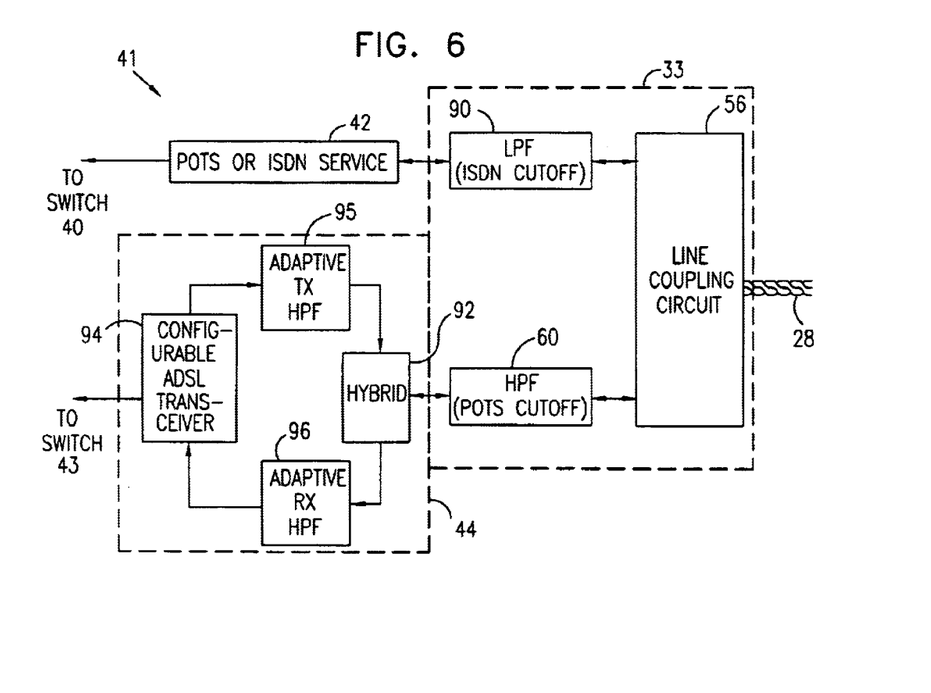
FIG. 6 is a block diagram that schematically illustrates subscriber line equipment for use in the system of FIG. 2, in accordance with another preferred embodiment of the present invention.

FIG. 6 is a block diagram that schematically illustrates details of subscriber line equipment 41, in accordance with a preferred embodiment of the present invention. Equipment 41 is largely similar to equipment 45, with the exception of the differences described hereinbelow. In the case of equipment 41, ADSL modem 44 is configurable either for Annex B ADSL service with ISDN, or for ADSL over POTS using masks 50 shown in FIG. 3. Thus, equipment 41 may also be used in place of equipment 45, simply by changing the settings of the filters and of a configurable ADSL transceiver 94 in modem 44.

A low-pass filter 90 in the low-frequency channel of equipment 41 (shown as belonging to ISDN modem 42) is preferably set to a cut-off frequency of 140 kHz, which can accommodate either ISDN service or POTS. On the other hand, in ADSL modem 44, high-pass filter 60 is set to about 20 kHz, so that tones 6–31 are available to the ADSL transceiver when this range is not used for ISDN. Alternatively, filters 60 and 90 are switchable between ISDN and POTS cut-off frequencies. An adaptive high-pass transmit filter 95 and receive filter 96 are preferably used to increase the downstream and upstream high-pass cutoff frequencies of modem 44 when line 28 is shared with ISDN service, so as to reject interruptions that may occur in the upstream ADSL data. Such interruptions occur, for example, due to high-frequency signals that are generated when the subscriber takes telephone 31 on or off the hook to make or hang up a call. When equipment 41 is used for ADSL over POTS, the added filtering of filters 95 and 96 is switched to a POTS high-frecuency cut-off or is turned off.

A hybrid circuit 92 and ADSL transceiver 94 in equipment 41 are generally similar to hybrid circuit 62 and transceiver 64. Transceiver 94, however, allows the ADSL upstream and downstream bands to be switched as required between the Annex B profile shown in FIG. 1 and masks 50 shown in FIG. 3. In place of filters 72 and 82, transceiver 94 includes adaptive digital filters for both the downstream (transmit) and upstream (receive) signals, each of which has a switchable lower band section corresponding to the range of tones 6 through 31. For Annex. B service, the lower band section is switched off in ADSL transceiver 94, while for ADSL over POTS, the lower hand section is switched on.

Although preferred embodiments are described hereinabove with specific reference to ADSL service over ISDN, it will be understood that the principles of the present invention are similarly applicable to other high-speed digital transmission standards, and particularly to different combinations of xDSL services with other, lower-speed data services that share the same infrastructure. It will be further appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for providing Asymmetric Digital Subscriber Line (ADSL) service to a subscriber over a subscriber loop, the method comprising:
    transmitting ADSL signals downstream over the subscriber loop in a lower band consisting approximately of the range of ADSL tones 6 through 31 and in an upper band consisting approximately of the range of ADSL tones 64 and above, but not in a middle band between the lower and upper bands; and
    receiving ADSL signals upstream from the subscriber loop in the lower band and in the middle band, but not in the upper band, such that the ADSL signals are carried both upstream and downstream on at least some of the tones in the lower band.

2. A method according to claim 1, wherein receiving the ADSL signals upstream comprises receiving and processing signals only in the lower band when the subscriber is not equipped to transmit signals in the middle band.

3. A method for providing Asymmetric Digital Subscriber Line (ADSL) service to a subscriber over a subscriber loop, the method comprising:
    transmitting ADSL signals downstream over the subscriber loop in a lower band consisting approximately of the range of ADSL tones 6 through 31 and in an upper band consisting approximately of the range of ADSL tones 64 and above, but not in a middle band between the lower and upper bands; and
    receiving ADSL signals upstream from the subscriber loop in the lower band, but not in the middle band or the upper band, such that the ADSL signals are carried both upstream and downstream on at least some of the tones in the lower band.

4. Apparatus for providing Digital Subscriber Line (DSL) service to a subscriber over a subscriber loop, the modem comprising:
    downstream processing circuitry, configured to generate DSL signals to be transmitted over the subscriber loop in a lower frequency band, having a low-frequency cut-off above a plain old telephone service (POTS) band, and in an upper frequency band, but not in a middle frequency band between the upper and lower bands; and
    upstream processing circuitry, configured to receive DSL signals upstream from the subscriber loop in the lower band and in the middle band, but not in the upper band, wherein the DSL signals are carried both upstream and downstream over at least a portion of the lower band.

5. Apparatus according to claim 4, wherein the DSL service comprises Asymmetric DSL (ADSL) service, and the DSL signals comprise discrete multitone (DMT) signals, and wherein the lower band consists approximately of the range of ADSL tones 6 through 31, and the middle band consists approximately of the range of ADSL tones 32 through 63.

6. Apparatus according to claim 4, and comprising an echo canceler, for canceling echoes in the upstream DSL signals due to the DSL signals transmitted downstream in the lower band.

7. Apparatus according to claim 6, wherein a range of tones near an upper edge of the middle band are substantially eliminated from the upstream signals, and wherein a range of tones near a lower edge of the upper band are substantially eliminated from the downstream signals, whereby only echoes in the lower band need be canceled by the echo canceler.

8. Apparatus according to claim 4, wherein the downstream and upstream processing circuitry is configurable so as to limit the DSL signals to the middle and upper bands, whereby the lower band is made available for another digital network service.

9. Apparatus according to claim 8, wherein when the circuitry is configured so as to limit the DSL signals to the middle and upper bands, the apparatus is further configured to provide Integrated Services Digital Network (ISDN) service on the subscriber loop in the lower band.

10. Apparatus according to claim 9, wherein the ISDN service is provided substantially in accordance with Annex B of standard G.992.1 (1999) of the International Telecommunications Union.

11. Apparatus according to claim 8, and comprising a line coupling circuit, which is adapted to couple both the downstream and upstream DSL processing circuitry and signals associated with the other digital network service to the subscriber loop.

12. Apparatus according to claim 11, and comprising:
   a high-pass filter, operative to implement the low-frequency cut-off of the lower band in the DSL signals, at approximately an upper edge of the plain old telephone service (POTS) band; and
   a low-pass filter, operative to implement a high-frequency cut-off in the signals associated with the other digital network service, at approximately a high-frequency limit of the other digital network service, substantially above the upper edge of the POTS band.

13. Apparatus according to claim 12, wherein the upstream processing circuitry comprises a configurable filter, which cuts off signals in the lower band when the lower band is used for the other digital network service.

* * * * *